United States Patent [19]

Martin

[11] Patent Number: 4,674,757
[45] Date of Patent: Jun. 23, 1987

[54] STAIR-CLIMBING WHEEL UTILIZING AN INVOLUTE CURVE CONFIGURATION

[76] Inventor: William B. Martin, 625 Esplanade, Unit 22, Redondo Beach, Calif. 90277

[21] Appl. No.: 747,835

[22] Filed: Jun. 24, 1985

[51] Int. Cl.$^4$ .............................. B62B 5/02; B62B 9/02
[52] U.S. Cl. ..................................... 280/5.26; 180/7.1; 180/8.2; 280/47.27; 301/41 R; 305/1
[58] Field of Search ................. 280/5.26, 5.22, 43.21, 280/43.22, 43.13, 47.27; 180/8.2, 907, 7.1; 305/1, 60; 301/41 R, 5 R

[56] References Cited

U.S. PATENT DOCUMENTS

| | | | |
|---|---|---|---|
| 2,633,363 | 3/1953 | Marshall | 280/47.27 X |
| 2,736,564 | 2/1956 | Loam et al. | 280/5.26 |
| 2,742,973 | 4/1956 | Johannesen | 180/8.2 |
| 2,790,503 | 4/1957 | Kopczynski | 305/60 X |
| 3,058,754 | 10/1962 | Whitaker | 280/5.26 |
| 3,178,193 | 4/1965 | Grogan | 280/5.26 |
| 3,214,184 | 10/1965 | Kemm | 280/5.26 |
| 3,283,839 | 11/1966 | Brown et al. | 180/8.2 |
| 3,326,563 | 6/1967 | Whitaker | 280/5.26 |
| 3,515,401 | 6/1970 | Gross | 280/5.26 |
| 4,542,918 | 9/1985 | Singleton | 280/43.22 X |

FOREIGN PATENT DOCUMENTS 110569 7/1982 Japan.
1032761 6/1966 United Kingdom.

Primary Examiner—John J. Love
Assistant Examiner—Mitchell J. Hill
Attorney, Agent, or Firm—Henry M. Bissell

[57] ABSTRACT

A wheel for use with a variety of devices for moving a load up or down a series of stairs is disclosed, which wheel is comprised of a plurality of lobes like teeth on a gear. Each lobe has two surfaces which are symmetrical around a lobe center line, with each surface being made up of a portion of an involute curve defined by a circle having a particular radius. The involute curves making up the surfaces of each lobe mirror each other on opposite sides of the center line and intersect to form the lobe at the largest radii of the portions of the involute curves making up the surfaces of the lobe. The wheel may be made to specifications allowing exact fit on a particular size stairstep and a properly fitting wheel will move in a close approximation of a straight line parallel to the staircase incline as it moves up a flight of stairs.

18 Claims, 7 Drawing Figures

STAIR-CLIMBING WHEEL UTILIZING AN INVOLUTE CURVE CONFIGURATION

BACKGROUND OF THE INVENTION

1. Field of the Invention

The present invention relates generally to a specialized type of wheel utilized in devices designed for climbing stairs and, more particularly, to a novel configuration for such a wheel incorporating a plurality of involute curves into the outer surface of the wheel to allow a substantially sxooth ascent or descent of stairs.

2. Description of the Prior Art

There is and has been a substantial problem in moving a load too heavy to merely carry up a flight of stairs. The most popular approach has been to use a dolly having conventional round wheels to carry a load up the stairs. However, by using a dolly, the flight of stairs must be ascended one step at a time, by lifting the load up the rise of each step and then rolling it back on the tread of the step to the edge of the next step, and repeating the process until the load is at the top of the stairs. The conventional round wheel has substantial utility in a dolly despite the tedious effort required, but it has not been possible to use the basic round wheel in many applications more complex than the simple dolly.

The next step forward in the art has been demonstrated in a substantial number of patents, and involves modifying the wheel by providing a mounting arrangement allowing multiple wheels to be mounted on a revolving hub to allow the smaller multiple wheels to be levered around the edge of a step. Specific examples of this configuration may be found in U.S. Pat. Nos. 2,742,973, 3,326,563, and 3,515,401, which are representative of a large number of such patents in the United States and abroad. For some reason this technique has found particular application in wheelchairs, although such wheelchairs are thought to be rather risky and not very practical.

While these devices do present some advantage over the basic simple wheel, without exception they have tremendous disadvantage with respect to the non-linear path traveled by the center line of the axle connecting the wheel assemblies to the devices, as well as the loads carried by the devices. The old saying that the shortest distance between two points is a straight line is particularly true when moving loads up or down stairs, and unfortunately a straight line is not available in the operation of the devices using the multiple wheel configuration described above.

As the multiple wheels in such devices swivel about the mounting hubs, the central point of the mounting hubs moves at times in a horizontal direction and at times in a vertical direction, but rarely in a direction paralleling the ascent of the stairs. The advantage resulting from the multiple wheel configurations is two-fold: first, the principle of the lever is used to climb to the next highest stair and, second, optional ratcheting mechanisms in some references resist hub movements characterizing a downward movement of the device. While these advantages probably offset the higher construction cost of the devices in some cases, the additional cost is bound to be a negative factor, particularly in combination with the substantial disadvantage of not being able to move loads in a straight line on stairs.

It is therefore apparent that it would be desirable to have a wheel for use with a variety of devices to enable movement of the devices up and down stairs in a substantially straight line, rather than bumping up or down the individual stairs. Such a wheel should function to move up stairs with the hub or mounting point moving in an uninterrupted fashion without requiring any external mechanization to move the wheel The wheel should be constructed in one piece as far as possible to minimize the cost of construction.

It is desirable that the wheel be adaptable to use with any of the plurality of devices which may be operated on stairs. The wheel should also have a high quality of construction to make it durable and long lasting as well as inexpensive. Finally, the wheel should present all of these advantages without substantial disadvantage.

SUMMARY OF THE INVENTION

The present invention utilizes the principles of the involute curve to present the substantial advantages described above over the art. The involute curve is a curve that cuts at right angles to all tangents of a defining curve which is, in this application, a circle. If a string is wound about the defining circle and, while remaining taut, is unwound, the end of the string being unwound defines the involute of the circle.

The wheel of the present invention in its basic embodiment is analogous to a gear with three teeth, with the surfaces of the teeth being camming surfaces defined by involute curves. A total of six involute curves are designed into each wheel to make up the six working surfaces of the three teeth of the wheel. The involute curves are designed to exactly fit the configuration of a given stair size, with the basic embodiment being designed to fit an average staircase.

By utilizing an involute curve design, the wheel rolls on the steps in an exact manner causing the center of the wheel, where it is mounted to whatever device it is being used on, to move in a substantially parallel line to the stairs. The movement of the device is thus linear, and does not require separate and distinct upward and lateral movements of the device.

Alternate embodiments are disclosed which have different numbers of teeth than the three of the preferred embodiments. In addition, embodiments are disclosed which provide one or more conventional wheels which are extendible to allow the wheeled device to move easily along flat surfaces if the device the wheel is on is not exclusively used on stairs.

The wheel of the present invention may be used on a number of devices, including a dolly, or other such device adapted to climb stairs. The wheel may also be adapted to any other use requiring climbing of stairs. It may include a ratchet type mechanism to prevent rolling back down the stairs.

It may therefore be appreciated that the present invention provides a wheel which may be utilized on devices for carrying loads up or down stairs, the devices being capable for the first time of moving in a linear fashion and substantially parallel to the stairs. The wheel costs substantially less than previous such devices, while representing a substantial improvement over them. The wheel of the present invention therefore represents a substantial improvement in the art, and makes practical the design of a wheel to be used in devices for more easily carrying loads up stairs.

BRIEF DESCRIPTION OF THE DRAWING

A better understanding of the present invention may be had from a consideration of the following detailed description, taken in conjunction with the accompanying drawings in which.

DESCRIPTION OF THE PREFERRED EMBODIMENTS

Figure 1:
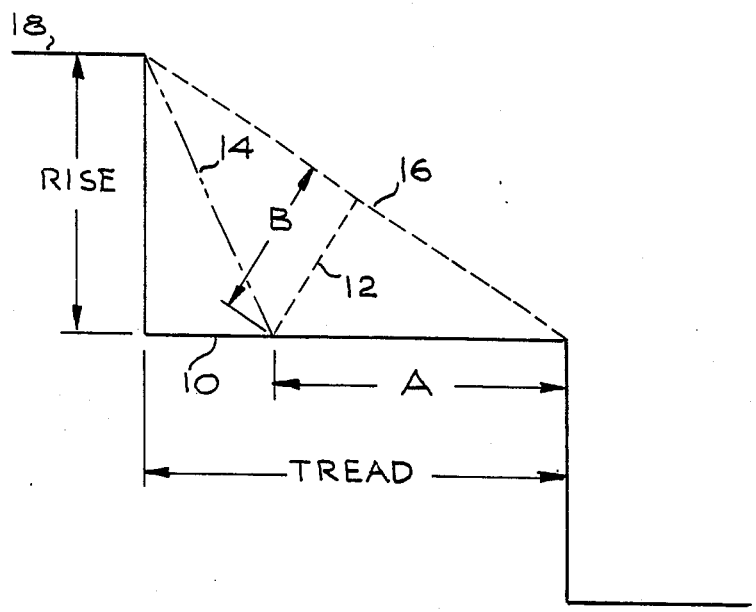
FIG. 1 is a diagram illustrating the dimensions of a single step in a series of stairs, the dimensions being of note in the design of the wheel of the present invention.

The dimensions of a wheel in accordance with the present invention used to allow travel of a load in a line substantially parallel to the stair incline are dictated by the dimensions of the stairs themselves. In FIG. 1, a single stair step 10 is shown to have a certain tread length and rise height. It has been determined that an average staircase has a rise of 7 inches and a tread of 11.2 inches. While it is apparent that there exist virtually an infinite number of steps having differing dimensions, the average numbers given here will likely not be greatly different from a large percentage of these steps.

Those skilled in the art will realize that by designing a wheel to fit a particular size step, operation of the wheel will be highly efficient and the load will be moved more easily. The incline of the average staircase having a 7-inch rise and an 11.2-inch tread is 32°, and by proper design of a wheel according to the teachings of the present invention, the load may be moved up the stairs in a substantially straight line at the same 32° incline.

If a phantom line 16 is added as shown in FIG. 1, the surface of the tread A is mirrored about the line 12, which is the perpendicular bisector of line 16. The length A, which is the effective tread, equals the length of the phantom line 14 by the rule of isosceles triangles. For the average step having the dimensions given above, length A is 7.79 inches and length B (equal to the altitude 12) is 4.13 inches.

Figure 2:
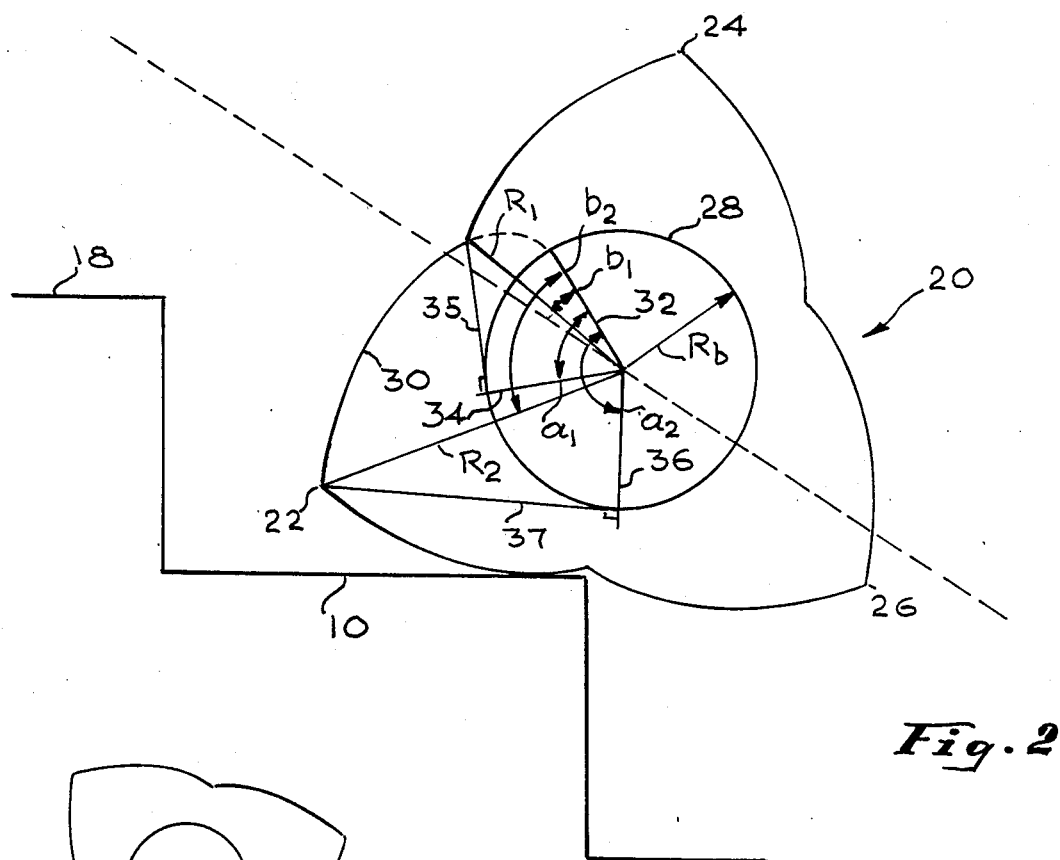
FIG. 2 is a schematic illustration of the configuration of one preferred embodiment of the wheel of the present invention shown on the step of FIG. 1.

It has been discovered that by using a wheel having outer surfaces made up of a number of involute curves, the wheel may be mated with a step having particular dimensions, such as the step 10 of FIG. 1. The preferred embodiment of this wheel is illustrated in FIG. 2, which shows a wheel 20 on the edge of the step 10. The wheel 20 is similar to a gear having three teeth, with the wheel 20 having, instead of teeth, three lobes 22, 24 and 26. Each of these three lobes 22, 24 and 26 is defined by two adjacent involute curves, with the involute curves intersecting to define the lobe at the largest radius of the portions of the involute curves making up the surfaces of the lobe. Each of the lobes 22, 24 and 26 is thus symmetrical about a center line, with the portions of the two involute curves making up the surfaces of the lobe mirroring each other on opposite sides of the center line.

The involute curves making up the surfaces of the lobes are all defined by a circle 28 having a particular radius called $R_b$. Note that the circle 28 is of such a dimension as to cause the end of a taut string wrapped around it to define an involute curve, such as the involute curves making up the three lobes 22, 24 and 26 when the string is unwrapped from the circle 28.

For purposes of simplicity, only one of these involute curves is shown completely, with that involute curve 30 making up one surface of the lobe 22. Note that the portion of the involute curve 30 making up one side of the lobe 22 may be seen as analogous to one surface of a gear tooth in the analogy of the wheel 20 compared to a gear. The portion of the involute curve 30 not making up the one surface of the lobe 22 is shown in FIG. 2 as a dotted line.

The portion of the involute curve 30 making up the one side of the lobe 22 is defined by at least two of four angles and two radii, as shown in FIG. 2. One of the angles, $a_1$ or $b_1$, and the radius $R_1$ define the beginning point of the portion of the involute curve 30 making up the one side of the lobe 22, with one of the angles, $a_2$ or $b_2$, and the radius $R_2$ defining the ending point of the portion. Note that the angles $a_1$ and $a_2$ are referenced between radii of the defining circle 28, the radii each being orthogonal to a unique tangent to the circle 28, which unique tangent is also orthogonal to a point on the involute curve 30. For the example illustrated in FIG. 2, the angles $a_1$ and $a_2$ are referenced from a radius 32 of the circle 28 extending to the point on the circle 28 at which the involute curve 30 begins. Angle $a_1$ extends to the radius 24 which is orthogonal to the tangent 35 which in turn is orthogonal to the involute curve 30 at the point the involute curve 30 is a distance of radius $R_1$ from the center of the circle 28, thereby defining angle $a_1$ between radius 32 and radius 34. Angle $b_1$ is the angle between radius 32 and radius $R_1$. Angle $a_2$ extends to the radius 36 which is orthogonal to the tangent 37 which in turn is orthogonal to the involute curve 30 at the point the involute curve 30 is a distance of radius $R_2$ from the center of the circle 28, thereby angle $a_2$ between radius 32 and radius 36. Angle $b_2$ is the angle between radius 32 and radius $R_2$.

These relationships are characteristic of any involute curve defined by a circle, and may be better understood by viewing the involute curve 30 as being drawn by a taut string being unwrapped from the defining circle 28. The end of the string would lie at the point on the circle 28 the radius 32 extends to, with the string extending counterclockwise from that end. As the string is unwound to form the involute curve 30, the string will extend at a series of tangents from the circle 28. At the point on the involute curve 30 having the radius $R_j$, the string will intersect the tangent 35. At the point on the involute curve 30 having the radius $R_2$, the string will intersect the tangent 37. This is the way the involute curve 30 defines one side of the lobe 22. Since there are three lobes 22, 24, and 26, each lobe is 120° wide, thereby making each involute curve portion making up one side of a lobe 60° in angular width. It is apparent that since each portion of involute curve making up one side of a lobe is 60°, the difference between angles $b_1$ and $b_2$ is 60° or 1.0472 radians.

The formulas relating these variables are derived from the mathematical relationships describing involute curves, and are for the length of the arc which is the portion of the involute curve 30 making up one side of the lobe 22, and for the difference in radii from one end of this arc to the other. To achieve a fit, the effective tread A is set equal to the involute arc length, $S_2-S_1$, and the involute rise, $R_2-R_1$, is set equal to dimension B (FIG. 1):

$$A = S_2 - S_1 = \frac{R_b(a_2^2 - a_1^2)}{2} \quad (1)$$

$$B = R_2 - R_1 = R_b[(1 + a_2^2)^{\frac{1}{2}} - (1 + a_1^2)^{\frac{1}{2}}] \quad (2)$$

The other relationship necessary to solve these equations is:

$$b_2 - b_1 = (a_2 - \arctan a_2) - (a_1 - \arctan a_1) \quad (3)$$

This equation is derived from the trigonometrical relationships whereby the difference betweeen the angle $a_1$ and the angle $b_1$ is equal to $\arctan(a_1)$, and the difference between the angle $a_2$ and the angle $b_2$ is equal to $\arctan(a_2)$. From the dimensions of the average step 10 discussed above in relation to FIG. 1, the arc length $(S_2-S_1)$ must equal 7.79 inches, and the difference between radii $(R_2-R_1)$ must equal 4.13 inches. The above three equations may then be solved simultaneously, to yield the following results:

$a_1 = 0.7507$ radians
$a_2 = 2.3175$ radians
$R_b = 3.2409$ inches
$R_1 = 4.0525$ inches
$R_2 = 8.1802$ inches.

This result is not quite entirely satisfactory, since it has been found that the resulting wheel made according to these calculated values has a small problem. While the wheel 20 will pivot at the length A shown in FIG. 1, the length of the chord defined by the ends of the arc made by the involute curve 30 and forming one side of the lobe 22 for the wheel 20 made according to the values specified above will be 7.08 inches. From FIG. 1, the second phantom line 14 is 7.79 inches long, so it can be seen that the wheel made according to the values specified above will be slightly small.

Figure 3:
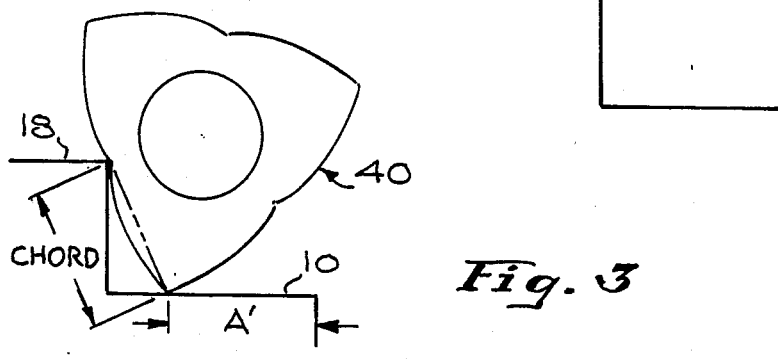
FIG. 3 is a schematic illustration of the wheel of FIG. 2 as it reaches the next step, thereby illustrating the final design considerations based on applicable geometric relationships.

A smoother fit between the wheel 20 and the step 10 results when the wheel 20 is made slightly larger. By doing this, the length A in FIG. 1 is extended slightly, as shown with a larger wheel 40 in FIG. 3 with the length A', which is slightly longer than the length A. The length A' has been determined to be 8.32 inches for the average step having the dimensions given in the discussion of FIG. 1, and is equal to the arc length of the portion of the involute curve 30 forming one side of the lobe 22. The chord length of the portion of the involute curve 30 forming one side of the lobe 22 on the wheel 40 is 7.57 inches, which chord length is equal to the length from the point which is the length A' from the edge of the step 10 to the edge of the next step 18. Therefore, this length of 7.57 inches will exactly fit the wheel 40 to the step 10, as shown in FIG. 3. The values defining the wheel 40 in FIG. 3, which are the values for a wheel designed to exactly fit the average step 10, are the following:

$a_1 = 0.7507$ radians
$a_2 = 2.3175$ radians
$R_b = 3.4614$ inches
$R_1 = 4.3282$ inches
$R_2 = 8.7368$ inches.

It will be appreciated by those skilled in the art that the wheel 40 will exactly fit stairs having a step the size of step 10, allowing a load carried by the wheel 40, or a plurality of wheels, to be more easily moved up a flight of stairs. Movement will be in a substantially straight line, rather than a bumping motion up or down the stairs. The wheel 40 will also work quite well on stairs not having the exact dimensions of step 10, so long as the dimensions of those stairs are a reasonably close approximation of the dimensions of step 10. It will also be appreciated by those skilled in the art that custom wheel sizes may easily be calculated and manufactured according to the principles taught by the present invention.

If need be, a slip-resistant outer coating on the wheel to prevent it from sliding on the steps may be provided. However, this should not be necessary because generally the axle friction will be substantially less than that of the staircase/wheel interface.

Figure 4:
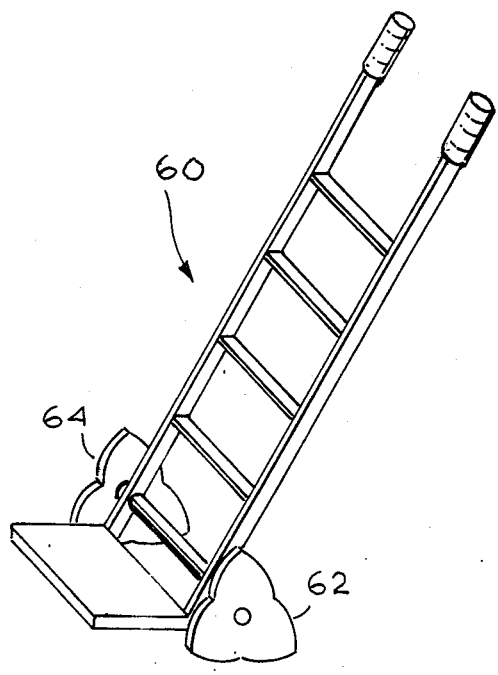
FIG. 4 shows a dolly using the wheel of the present invention.
Figure 6:
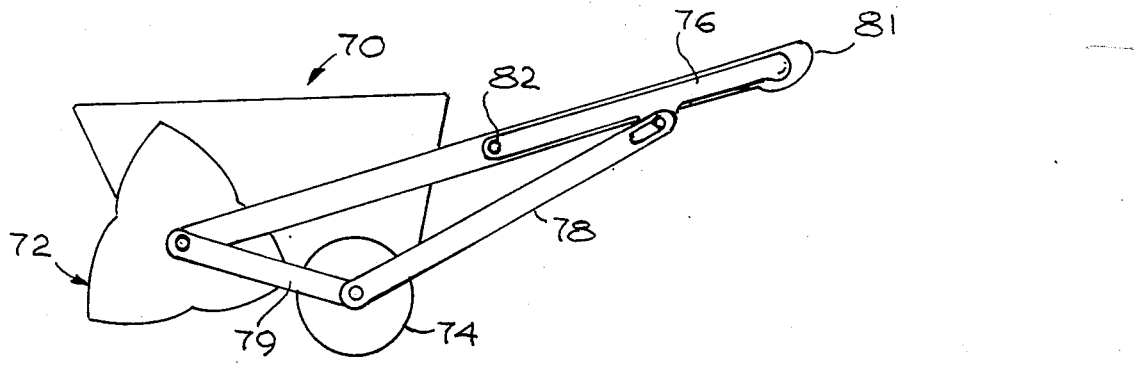
FIG. 6 illustrates one particular embodiment of a hand cart equipped with a wheel of the present invention in addition to means for permitting transport on flat terrain.

The wheel taught herein may be used in a number of applications concerned with moving a load up or down a flight of stairs, with only a few of these applications being specifically shown in the figures. FIG. 4 illustrates the wheel of the present invention being used on a dolly 60 having two such wheels 62 and 64. FIG. 6 shows a handcart-type device 70 which also has a pair of wheels 72 built according to the teachings of the present invention.

Figure 5:
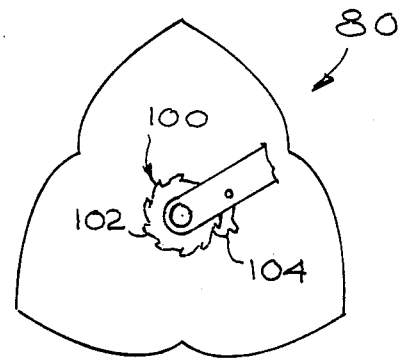
FIG. 5 illustrates an embodiment of the wheel of the present invention providing a ratcheting arrangement for limiting reverse movement.

An additional feature which may be easily added to the wheel of the present invention is a ratchet mechanism to allow one-way rotation of the wheel. By doing so, a wheel may be set to go only up stairs at a particular time, with the ratchet mechanism preventing the wheel and its payload from accidentally slipping down the stairs. Such an arrangement is shown in part in FIG. 5 having a ratchet mechanism 100 comprising an anti-reverse ratchet wheel 102 mounted on the wheel and a selectively engageable lever 104 to prevent the wheel from turning backward when the lever 104 is set, as shown, to engage the ratchet 102.

Figure 7:
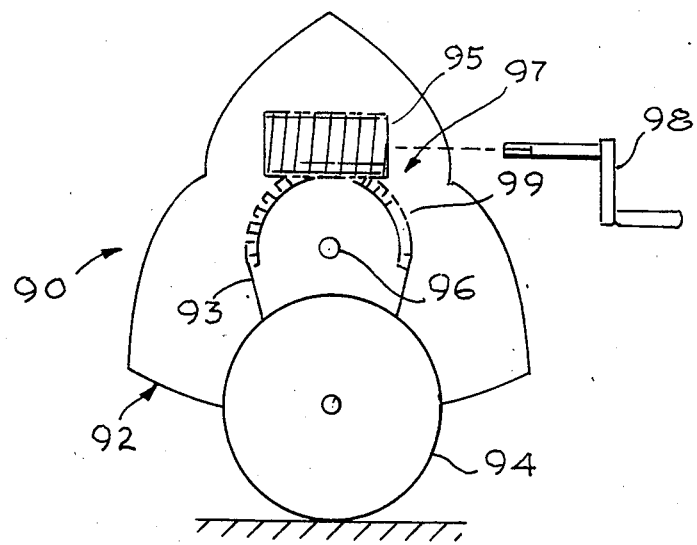
FIG. 7 is a schematic representation of an alternative embodiment to that of FIG. 6.

It may well be desirable for a device utilizing the wheel of the present invention to be able to roll easily on a flat surface as well as on stairs. Therefore, the alternative embodiments of FIGS. 6 and 7 are provided. As shown in FIG. 6, the handcart 70 includes an auxiliary wheel 74 of conventional form which is extendible/retractable by means of the lever 76 and links 78, 79. The hand lever 76, which is pivotably mounted on the handle 81 of the handcart 70, may be lifted about its pivot point 82 to retract the wheel 74 when the handcart 70 approaches a stairstep at which the involute curve wheel 72 is to be operative.

The operative parts of an alternative embodiment 90 are illustrated schematically in FIG. 7. This indicates the relative positions of an involute curve wheel 92 and a retractable wheel 94 of conventional form which is supported for pivoting about the axis 96 when driven by a worm gear assembly 97, as by means of a removable crank 98. The assembly 97 includes a rotatable worm gear 95 and a mating worm wheel gear 99 on a retracting frame 93 which supports the conventional wheel 94. Shown in extended configuration, the wheel 94 is retracted from operative position by rotating the worm gear 95 by means of the crank handle 98, thereby pivoting the frame element 93 about the axis 96 to a position displaced approximately 90° relative to that shown. This completely retracts the wheel 94 so that the involute curve wheel 90 is enabled to contact a staircase and perform its stair climbing function in the manner described herein.

Although the wheel of the preferred embodiment has three lobes, it is possible to utilize a wheel having a greater number of lobes, if desired. If more lobes are utilized, the wheel would be larger, which would probably be advantageous for a vehicle such as a wheelchair if the wheelchair could be stabilized adequately.

It is therefore apparent that the present invention provides a teaching of construction of a wheel for use with stairs to solve the problems encountered in use of a simple wheel. The present invention represents a substantial improvement over the art, and has several readily apparent advantages over past devices directed to the same purpose. First of all, the wheel of the present invention is relatively inexpensive, since it is of one-piece construction rather than consisting of several wheels mounted in a single hub. The wheel of the present invention allows loads to be moved up and down stairs in a straight line substantially parallel to the stairs, making the moving of the load much easier. Finally, the present invention accomplishes these significant accomplishments without any notable disadvantages, making it a desirable improvement in the art.

Although there have been described above specific arrangements of an improved stair-climbing wheel utilizing an involute curve configuration in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A wheel for use in transporting a load up and down a staircase constructed of a series of like stairsteps comprising:
a plurality of lobes having two surfaces, each of said surfaces of said lobes comprising a portion of an involute curve which is defined by a circle of radius $R_b$, each of said plurality of lobes being symmetrical about a lobe center line, with the portions of the two involute curves making up the surfaces of a given lobe mirroring each other on opposite sides of the lobe center line and intersecting to form the lobe at the largest radii of the portions of the involute curves making up the surfaces of the lobe.

2. A wheel as defined in claim 1 wherein said wheel has a center at the center of said circle, which center moves in a substantially straight line parallel to the incline of the staircase as said wheel moves up or down the stairsteps.

3. A wheel as defined in claim 1 wherein said wheel has three lobes, each of which lobes has a 120° angular measurement.

4. A wheel as defined in claim 3 wherein each of the portions of the involute curves making up the surfaces of the lobes is defined by a beginning point and an ending point, the beginning point for each of the portions of said involute curves defining the surfaces of the lobes being defined by a radius $R_1$ and an angle $b_1$, the radius $R_1$ being a length referenced from the center of said circle, the angle $b_1$ being referenced to the point at which the involute curves begin from the circle, the ending point for each of the portions of said involute curves defining the surfaces of the lobes being defined by a radius $R_2$ and an angle $b_2$, the radius $R_2$ being the length referenced from the center of said circle and the angle $b_2$ being referenced to the point at which the involute curves begin from the circle.

5. A wheel as defined in claim 4 wherein said wheel is designed to fit a step defined by a particular tread length and rise height, with the arc length of each of said portions of said involute curves defining the outer surfaces of each lobe having a length $S_2 - S_1$, which length is equal to a length $A'$ on the tread of said step, a point on the tread of said step being defined by a location which is the length $A'$ back from the edge of said step, said point on the tread of said step and the edge of the next higher step defining a distance which is equal to the chord of each of said portions of said involute curves defining the outer surfaces of each lobe.

6. A wheel as defined in claim 4 wherein each of said stairs is defined by a tread length of 11.2 inches and a rise of 7 inches, said wheel being defined by the following values:
$a_1 = 0.7507$ radians
$a_2 = 2.3175$ radians
$R_b = 3.4614$ inches
$R_1 = 4.3282$ inches
$R_2 = 8.7368$ inches wherein $a_1$ and $a_2$ are angles of the circle defining the involute curve which are referenced to the radius of said defining circle to the point of intersection of the involute curve with the circle, $a_1$ extends to the radius which is orthogonal to the tangent of the circle which intersects the involute curve at the beginning of a half lobe portion and $R_1$ is the involute curve radius to said intersection, $a_2$ extends to the radius which is orthogonal to the tangent of the circle which intersects the involute curve at the termination of the half lobe portion and $R_2$ is the involute curve radius to said last-mentioned intersection.

7. A wheel as defined in claim 1 additionally comprising a ratcheting mechanism allowing only one-way rotation of said wheel, thereby selectively preventing the wheel and its payload from moving backward down the stairs.

8. Apparatus including the wheel of claim 1 for transport up and down stairs in combination with a load supporting frame structure and at least one handle attached to the frame structure for controlling the apparatus.

9. The apparatus of claim 8 further including a retractable wheel assembly having a wheel of conventional form for transporting the device along a flat surface and a retracting mechanism, pivotably mounted to the wheel assembly, for retracting the additional wheel from operative contact with a support surface.

10. An improved design for a wheel to be used on stairs, comprising:
a circle having a first radius $R_b$, said circle defining a plurality of involute curves;
a plurality of lobes defining the outer surface of said wheel, each of which lobes has outer surfaces defined by two adjacent involute curves intersecting at the largest radii of the portions of the two involute curves defining the outer surfaces of each lobe, with the involute curves being defined by said circle;
a beginning point for the portions of each of said involute curves defining the outer surfaces of each lobe, said beginning point being defined by a radius $R_1$ and an angle $b_1$, the radius $R_1$ being a length referenced from the center of said circle, the angle $b_1$ being referenced to the point at which the involute curves begin from the circle; and an ending point for the portions of each of said involute curves defining the outer surfaces of each lobe, said ending point being defined by a radius $R_2$ and an angle $b_2$, the radius $R_2$ being a length referenced from the center of said circle, the angle $b_2$ being referenced to the point at which the involute curves begin from the circle.

11. An improved design for a wheel as defined in claim 10 wherein there are three lobes making up the outer surface of said wheel, with each of said portions of said involute curves defining the outer surfaces of each lobe having an angular width of 60°, therefore making $b_2 - b_1$ equal to 1.0472 radians.

12. An improved design for a wheel as defined in claim 11 wherein said wheel is designed to fit a step defined by a particular tread length and rise height, with the arc length of each of said portions of said involute curves defining the outer surfaces of each lobe having a length $S_2 - S_1$, which length is equal to a length $A'$ on the tread of said step extending back from the edge of said step to a point on the tread of said step, said point and the edge of the next higher step defining a distance which is equal to the chord of each of said portions of said involute curves defining the outer surfaces of each lobe.

13. An improved design for a wheel as defined in claim 11 further including a ratchet and sprocket assembly coupled to the wheel for selective engagement to limit travel to only one direction.

14. An improved design for a wheel as defined in claim 10 wherein the center of said circle moves in a substantially straight line parallel to the incline of said stairs.

15. A device for transporting a load up or down a series of stairs defined by a rise height and a tread length, said device having a pair of lobed wheels, each of which comprises:

three lobes making up the outer surface of said wheel, said three lobes each having two surfaces, each of said surfaces of said lobes comprising a portion of an involute curve which is defined by a circle of a particular radius, each of said three lobes being symmetrical about a lobe center line, with the portions of the two involute curves making up the surfaces of a lobe mirroring each other on opposite sides of the lobe center line and intersecting to form the lobe at the largest radii of the portions of the involute curves making up the surfaces of the lobe, each of said portions of an involute curve having an angular measure of 60°, with the arc length of each of said portions of an involute curve being equal to a length $A'$ which is defined from the edge of a stairstep to a point, where the chord length of each of said portions of the involute curves making up the surfaces of the lobe is equal to the distance between said point and the edge of the next higher step.

16. A device as defined in claim 15 wherein said device is a dolly.

17. A device as defined in claim 15 wherein said device is a handcart, and further including a pair of wheels of conventional form for supporting the handcart for rolling transport along a horizontal surface, said wheels being retractable from contact with said horizontal surface and being pivotably mounted to the handcart through a lever and link assembly.

18. A device as defined in claim 15 wherein said device is a handcart, and further including a pair of wheels of conventional form for supporting the handcart for rolling transport along a horizontal surface, said wheels being retractable from contact with said horizontal surface and being pivotably mounted on a pivot member aligned with the central axis of an associated lobed wheel and including a worm gear mechanism for rotating the conventional wheel about said axis to a position out of contact with the horizontal surface.

* * * * *